United States Patent [19]

Perzl et al.

[11] Patent Number: 5,097,475
[45] Date of Patent: Mar. 17, 1992

[54] ARRANGEMENT FOR THE INPUT OF ENERGY INTO A GAS-SWEPT ELECTRICAL GAS DISCHARGE

[75] Inventors: Peter R. Perzl, Fürstenfeldbruck; Heinz B. Puell, München; Wolfgang Rüberg, Aschheim; Robert Mayr, München; Axel R. Gregory, Oberursel, all of Fed. Rep. of Germany

[73] Assignee: Heraeus Holding GmbH, Hanau am Main, Fed. Rep. of Germany

[21] Appl. No.: 567,263

[22] Filed: Aug. 14, 1990

[51] Int. Cl.$^5$ .................................. H01S 3/0971
[52] U.S. Cl. ........................ 312/87; 372/86; 372/29; 372/38
[58] Field of Search ............. 372/83, 87, 38, 29, 372/86, 81, 55

[56] References Cited

U.S. PATENT DOCUMENTS

| | | | |
|---|---|---|---|
| 3,943,465 | 3/1976 | Aisenberg et al. | 372/83 |
| 4,156,208 | 5/1979 | Sasnett | 331/94.5 |
| 4,330,762 | 5/1982 | Kaye et al. | 372/38 |
| 4,449,220 | 5/1984 | Chenausky et al. | 372/83 |
| 4,488,309 | 12/1984 | Tanaka et al. | 372/87 |
| 4,574,381 | 3/1986 | Katz | 372/87 |
| 4,644,549 | 2/1987 | Oishi | 372/38 |
| 4,748,635 | 5/1988 | McLellan | 372/87 |
| 4,823,350 | 4/1989 | Yamazaki | 372/38 |
| 4,887,272 | 12/1989 | Karube et al. | 372/38 |

FOREIGN PATENT DOCUMENTS

| | | |
|---|---|---|
| 0235788 | 9/1987 | European Pat. Off. |
| 0267592 | 5/1988 | European Pat. Off. |
| 8201281 | 4/1982 | PCT Int'l Appl. |

Primary Examiner—Frank Gonzalez
Assistant Examiner—Susan S. Morse
Attorney, Agent, or Firm—Felfe & Lynch

[57] ABSTRACT

A high electrical power is input in a gas-swept electrical discharge for gas laser by controlling with a high electrical efficiency and without dissipative resistance. A discharge chamber is swept through with a gas at a high velocity wherein transverse to the flow direction, the gas discharge burns as a steady-field discharge between an anode and several cathodes opposite the anode. These are disposed in tandem in the flow direction. Power is supplied to each individual cathode by means of a fast, independently controlled switched-mode power supply unit constant current characteristics wherein the current is supplied to the switched-mode power supply unit by series-connected partial voltage sources of the cathodes. A pre-ionization device is provided on the flow bounding surface of the discharge chamber.

30 Claims, 9 Drawing Sheets

ARRANGEMENT FOR THE INPUT OF ENERGY INTO A GAS-SWEPT ELECTRICAL GAS DISCHARGE

BACKGROUND OF THE INVENTION

The invention relates to an arrangement for the input of energy into a gas-swept electrical discharge, particularly a gas laser, comprising a discharge chamber through which a gas is flowing at a high velocity and in which the gas discharge burns as a steady-field discharge between an anode and at least one cathode opposite the anode. A controllable switched-mode power supply is used to supply power to the electrodes.

An arrangement of this kind is known from DE-OS 34 46 145. This publication describes a direct current discharge gas laser having a power supply unit which is provided with a controllable alternating current source with a high internal impedance, a rectifier disposed downstream thereof and a charging capacitor which is connected to the output of the rectifier and parallel to the path of the gas discharge of the gas laser A transformer is interposed between the alternating current source and the charging capacitor for the purpose of galvanic separation. Further, it is possible to connect the primary windings of several transformers between the output terminals of the alternating current source with each of the secondary windings of the transformers each of which feeds one gas laser.

The total electric power required for the laser is supplied via the semiconductor switching device and the galvanically separating intermediate transformers. The efficiency is high and amounts to approximately 85%.

This power transmission is suitable for longitudinal-flow lasers of up to a few kW and is frequently configured as such. For transverse-flow high-performance lasers of 5 kW and more, requiring an electrical power of 50–150 kW, the labor and costs involved in high-performance semiconductor switching devices and transformers suitable for an operation frequency of 20–300 kHz is unrealistically high so that solutions of this kind are not known.

Another discharge device in the form of a gas laser is known from U.S. Pat. No. 4,449,220. The electrode arrangement thereof includes a plate-like anode and a row of individual cathodes in the form of massive rods running parallel thereto and disposed close to a wall of the gas flow channel. The walls of the gas flow channel run parallel to one another, and the channel is formed by an anode elongated in flow direction. The problem of this arrangement, however, is that the individual cathodes are in the wake or backwash of each preceding individual cathode, except for the one disposed first in flow direction. These highly heated backwash areas favor instabilities and greatly impair the heat removal at these individual cathodes. A consequence thereof is the heavy oxidization of the rods particularly in case of high power densities which are usually required. In molybdenum or tungsten rods, this effect is encountered increasingly, beginning with 600° C., for example. DE 28 56 328 to which U.S. Pat. No. 4,449,220 corresponds, further describes a steady-field pre-ionization which is generated by pin-like pre-ionization electrodes protruding from the wall of the discharge chamber. The auxiliary discharge in the area of this pre-ionization electrodes requires a power in the magnitude of 40% of the energy input.

To prevent excessive heating of the individual cathodes, use is often made of tubular cathodes, of copper for example, through which a coolant is pumped. Such an arrangement is disclosed in U.S. Pat. No. 4,077,018 wherein a gas laser is described in which the discharge chamber is surrounded by 3 individual electrodes through which a coolant constantly flows to remove the heat and give the cathodes a sufficiently long useful life. Experience shows, however, that the cathode life that can be achieved in this manner is sufficient to satisfy industrial requirements. The potential difference between the cathodes is invariably selected via ballast resistors.

Another discharge device in the form of a gas laser is known from U.S. Pat. No. 4,488,309. This gas laser has an anode which is expanded in flow direction and defines one side of the discharge channel for the gas. Several pin-like individual anodes running transversely to the gas flow and connected to the DC supply via a high-value starting resistor are located opposite this anode. A rod-like pre-ionization electrode having a conductive core enveloped by a dielectric coating is disposed centrally between the anode and the individual cathodes. The pre-ionization electrode is connected to an AC supply. Moreover, between the anode and the ground potential there is a capacitor and between the output of the power supply and the anode, there is in inductor which serves as an energy storage for pulse operation. Capacitor and inductor must be designed for a high pulse energy in order to maintain the continuous power of the DC supply at a low level. This arrangement permits generating a stable DC-glow discharge which can be easily switched and pulsed, i.e. it exhibits good starting properties; moreover, the discharge voltage of the DC-discharge decreases. In this arrangement, the pre-ionization discharge burns exclusively between the pre-ionization electrode and the anode since there are high-value starting resistors in the cathode circuit. A consequence thereof is that the gas volume in the discharge chamber is not uniformly pre-ionized and the relative power consumption is excessively high. The costs for the power supply are high since high-frequency alternating current is unreasonably expensive as compared to direct current.

An embodiment of a different kind of pre-ionization devices is known from WO 92/01281, to which U.S. Pat. No. 4,342,115 corresponds. This publication describes in particular the form of individual electrodes for steady-field pre-ionization. The possible forms mentioned include disks, T-like hooks, U-like hooks and L-like hooks which extend into the discharge chamber. This pre-ionization device requires a great amount of energy.

The increasing use of high-power lasers in material processing entails also increasingly high demands on economical and technical properties of the devices. Particular interest is attached to the overall efficiency of the laser and the regulated, fast control of the laser performance in order to select the desired mode of operation (for example cutting or welding) in a time range of <1 ms. In addition to optimizing the efficiency of the individual components, the input of electrical power into the laser medium and the adjustment of the discharge volume to the resonator geometry (or vice-versa) are of utmost importance. Particularly in transverse-flow lasers, the process and the device of the invention permit a pulsable start of the laser medium of a particularly high efficiency in the desired frequency range.

Several different arrangements, which, however, do not simultaneously meet the above requirements, are known for electrically activating the laser-active medium of high-power lasers, particularly $CO_2$-lasers.

A DC-activation requires the starting resistors necessary for stabilizing the discharge which in turn decrease the efficiency to 60–70%. Moreover, in transverse-flow lasers, the electrodes require a frequent segmentation which together with the cooling necessary for high-power performances involves high construction costs.

The laser power is controlled by controlling the supply voltages by means of 6- or 12-pulse thyristor controllers or thyristor bridges. In order to reduce the voltage modulation (up to 100%) given at the phase interface control to a value of <1% required for technical applications, it is necessary to use smoothing filters. These inductors and the relatively low system frequency of 50 Hz, which brings the bridge frequency to 300 Hz at the 6-pulse thyristor bridge and to 600 Hz at the 12-pulse thyristor bridge, extend the control delay to approximately 100 ms. This time constant is unacceptably long for many cutting and welding tasks.

The use of electron tubes as longitudinal controllers does provide a sufficient control speed, the overall efficiency, however, is reduced by theses tubes to such an extent that this technical option is only used in low-power longitudinal-flow lasers.

Further, it is known to use high-frequency generators which can be modulated in lasers in order to activate molecular gases. Electrical energy is input into the medium via dielectrically enveloped or purely metallic electrodes.

In high-frequency generators equipped with tubes for high-power performance and in circuits for compensating the blind component of the electrode system, the electrical overall efficiency ranges between 40 and 50%. All of the power required by the laser in the discharge chamber is supplied by the HF-generator.

The supply of actuating power from a modulable high-frequency generator, however, permits a regulated control of the laser energy to change the operational processes like cutting, welding and hardening at a time range of approximately 100 $\mu$s. Since the system permitted a fast control, the high operating costs caused by the low efficiency of the HF-generator, the high maintenance costs and the high purchase costs had to be accepted.

The discharge geometry can be well matched with the geometry of the laser resonator only in case of longitudinal-flow lasers. When applying the transverse-flow laser principle which is preferred in a performance range of >5 kW, this matching and hence a high optical efficiency of the resonator is little satisfactory.

SUMMARY OF THE INVENTION

GB-A 2,163,896 describes an expensive arrangement with rotatable electrodes. It is said to provide a theoretical partial solution to the matching of the discharge to the resonator geometry.

An object of the invention is the input of a great amount of electrical power in a flowing gas mixture transverse to the flow direction in a control range of 0–100%, defined by a lead voltage of 0–10 V, at a very small control time with high electrical efficiency and without dissipative resistances. Also included is the option of a modular design.

This object is accomplished in accordance with the invention in that a pre-ionization device is disposed on the flow-bounding side of the discharge chamber, in that the cathode is subdivided in several, at least two, individual cathodes disposed in tandem and in that energy is supplied to each individual cathode by at least one fast, independently controlling switched-mode power supply with constant current characteristics. Current is supplied to the switched-mode power supply units by means of a series connection of cathode partial voltage sources.

The high electrical efficiency of the subject-matter of the invention proved to be advantageous since the switched-mode control is directly galvanically integrated in the laser circuit. Due to its constant current characteristics, it compensates the negative resistance characteristics of the discharge path without dissipative resistances.

In a preferred embodiment, each switched-mode power supply unit is configured as a direct current controller which is connected to the anode via its corresponding direct current source. The respective cathode current, as a control value, is compared to the desired value associated with the respective individual cathode. In case of deviations, a control signal is supplied to the direct current controller. The direct current sources associated with the direct current controllers form a series connection.

The series connection of the direct current sources proved to be advantageous allowing to control the relatively high switch-off voltage ranging between 1500 to 2000 V also with semiconductors with a maximum voltage of 1000 V.

A field effect transistor is used as a controllable switching element within the direct current controller. The short switching times of this transistor during control deviations of the cathode current permit a fast readjustment until the prescribed desired value is achieved.

An additional direct current source of an uncontrolled anode can be interposed between the anode and the cathode current source. It is thus possible to increase the controlled power without additional switching controllers.

In a preferred embodiment, the individual cathodes are subdivided in partial segments running transverse to the flow direction of the gas. Each partial segment of each individual cathode has its own independently controlled switched-mode power supply unit. It proved to be advantageous that the ratio of partial cathode currents can be optimally matched with the respective gas temperature and operational conditions. All switched-mode power supplies are activated out of the same pulse generator thus avoiding shifts of the desired cathode current ratios due to counter-phase ripple of the voltage potentials of the individual cathodes.

Further, in a preferred embodiment, the anode, transversely to the flow direction, is subdivided in several juxtaposed individual anodes and/or partial segments within individual anodes. Power is supplied to each individual anode or partial segment by an independently controlling switched-mode power supply unit.

This measure permits sufficiently suppressing arc formation. Since anode segments in the marginal areas are operated at reduced current supply, it is possible to match them with the marginal gas flow.

One or several dielectrically enveloped electrodes fed by an AC generator which exhibits constant current characteristics are provided to pre-ionize the incoming gas.

The direct voltage sources of the cathodes have a negative voltage potential with respect to the housing surrounding the discharge chamber; the anodes have a positive potential with respect to the housing. It proved to be advantageous that small insulating distances can be used to reliably, simply and inexpensively avoid the generation of undesired glow discharges at the voltage passages through the wall of the laser vessel and at the power supply lines to the electrodes. Further, the generation of arc discharges between the positive anodes and the metallic gas plates, elbow bends and the laser vessel is also avoided.

The ratio of the cathode currents can be selected by activating the desired values of the switched-mode power supply. The control elements of the switched-mode power supply units can be synchronously controlled via an AC voltage generator and individual cathodes can be shut off separately. It proved to be advantageous when the ratio of the cathode currents is matched with the respective gas temperature and operating conditions and when the power control is automated.

Cathode current limiting devices are associated with each of the individual cathodes in order to interrupt the circuit of an individual cathode when a permissible current value is exceeded. The cathode current limiting device has a time element which closes the circuit again after a prescribed time has elapsed and allows the cathode current to increase again according to a prescribed function until it has returned to the original desired value. In case there are several successive shut-offs, this is sensed by an integrated circuit and after reaching a limit value, the discharge is then shut off in a controlled manner. Here, it proved to be advantageous that a permanent damage caused by continuously exceeding the cathode current can definitely be avoided. After the shut-off there is a controlled glow discharge via an auxiliary resistor and/or an auxiliary resistor together with an additional voltage source. A pulse-pause-modulator supplying a pulse sequence frequency between 12 kHz and 0.6 Hz is provided to activate and modulate the AC-generator.

The switch-on for the discharge and the pulse-pause modulator (which is synchronized with the AC-voltage generator in a phase-locked manner) is fully synchronized with the starting command. It proved to be advantageous that cathode voltage differences cannot cause a shift of the desired current ratios. Another advantage consists in the two possibilities of controlling the laser power. One of which is by changing the sensing ratio of the pulse-pause-modulator and, further, independently thereof by controlling the cathode currents. In addition to a high stability of the control properties, it is thus possible to achieve an optimal matching with the respective application.

Further, a preferred embodiment has partial segments of adjacent individual electrodes disposed transversely to the flow direction of the gas at approximately the same level which are operated via switched-mode power supply units each having at least one switching inductor associated with each partial segment. This also allows stabilizing the discharge conditions also when there are two parallel cathodes. In yet another embodiment, two individual cathodes or at least two partial segments of individual cathodes of first and second discharge modules are coupled to one another via a switched-mode supply unit or at least a switching inductor which are associated with each individual cathode or each partial segment. This arrangement permits achieving stable discharge conditions in each discharge modules.

DETAILED DESCRIPTION OF THE PREFERRED EMBODIMENT

Figure 1:
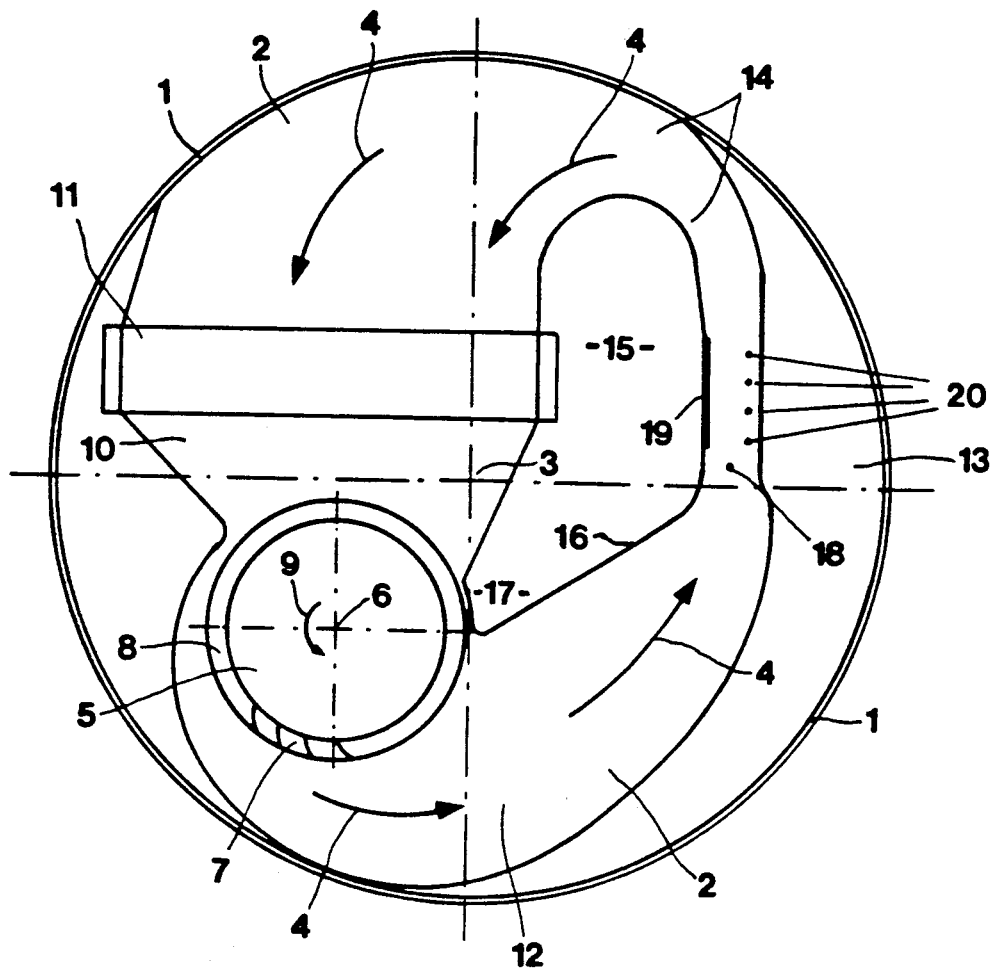
Figure 2:
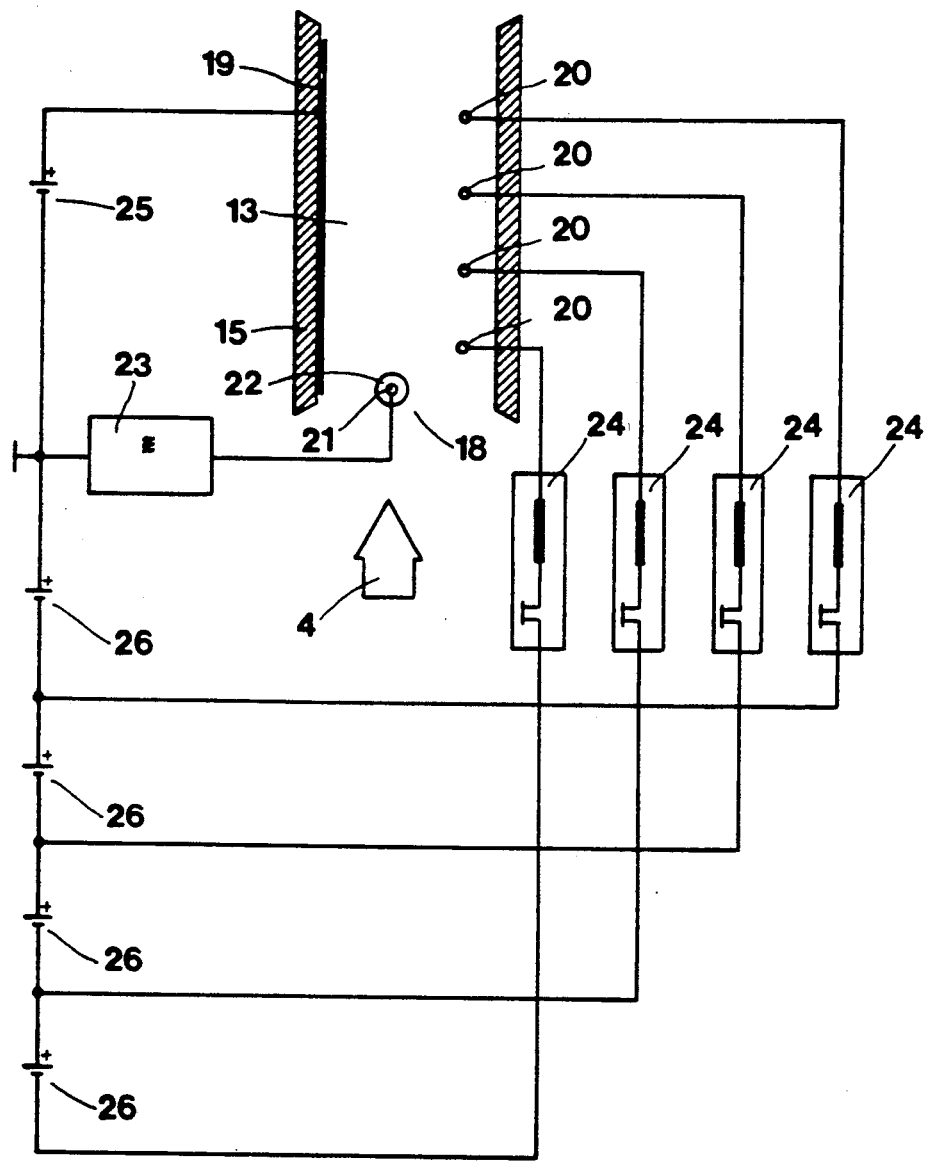
Figure 3:
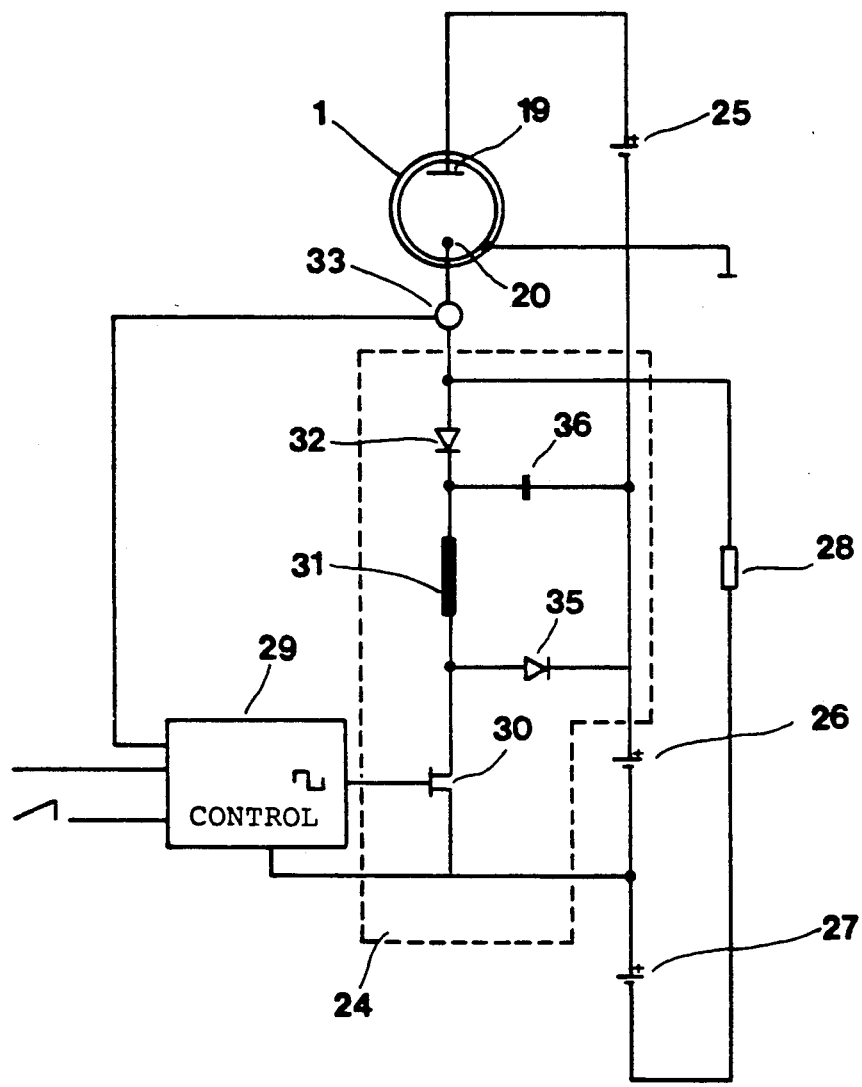
Figure 4:
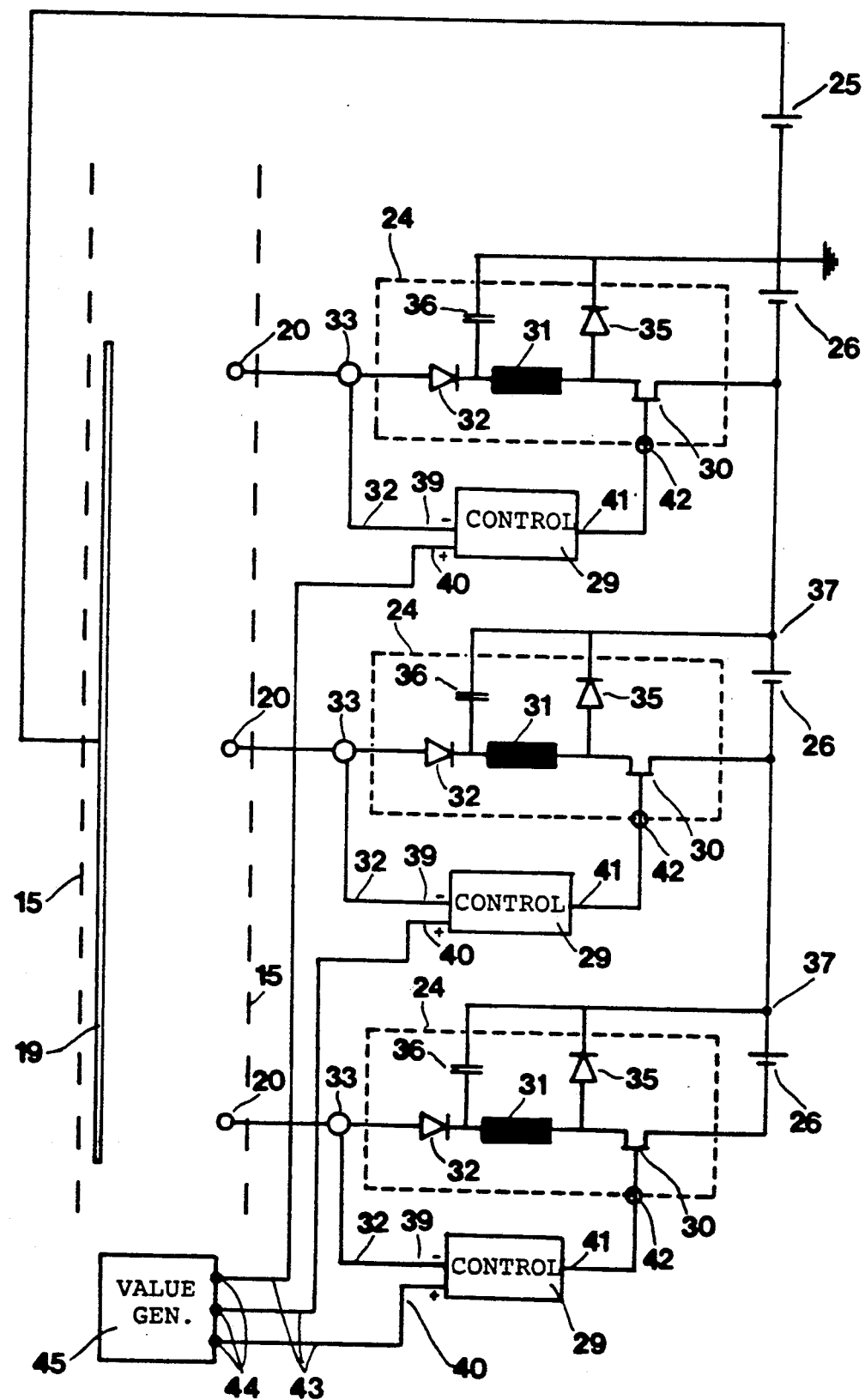
Figure 5:
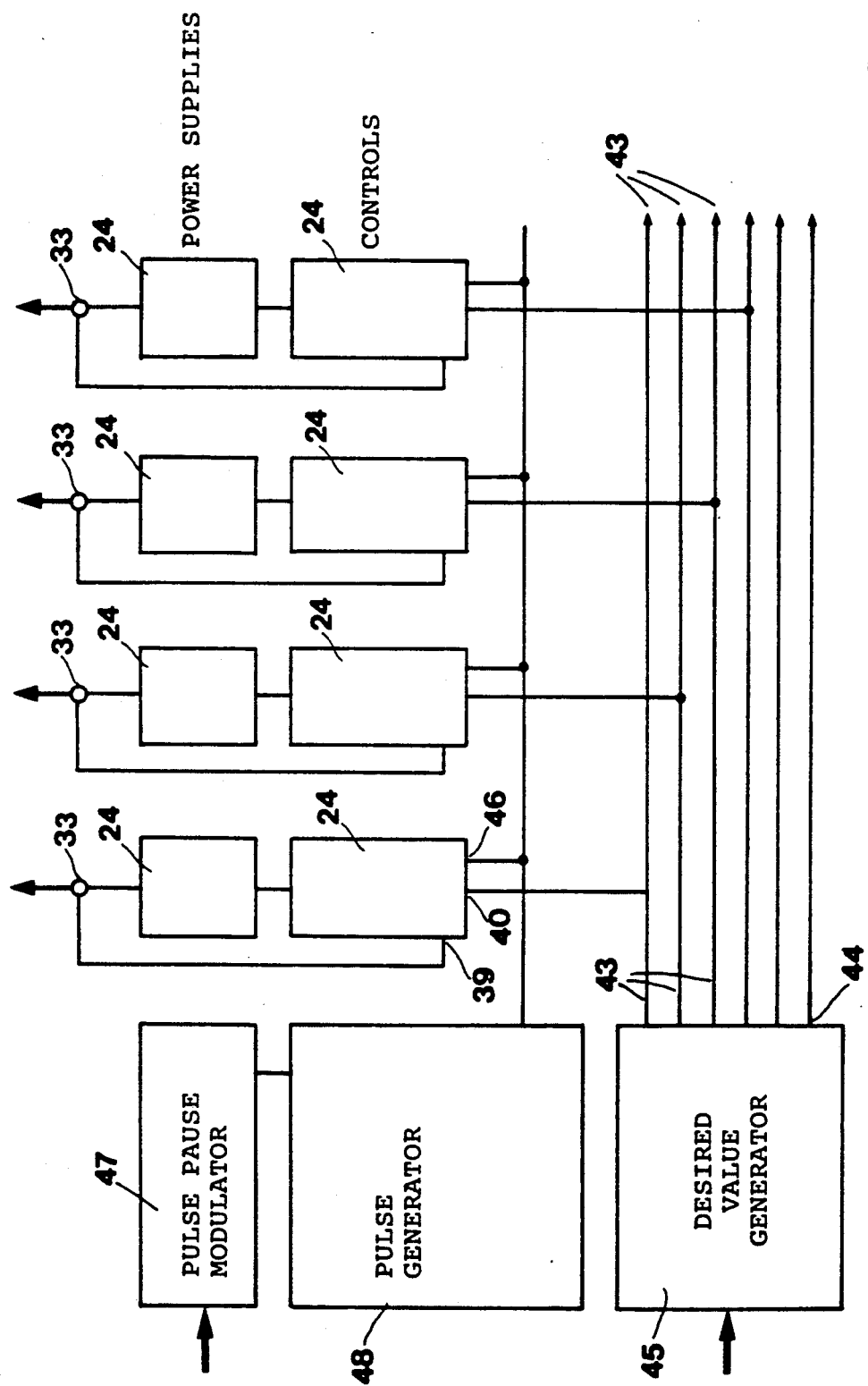
Figure 6:
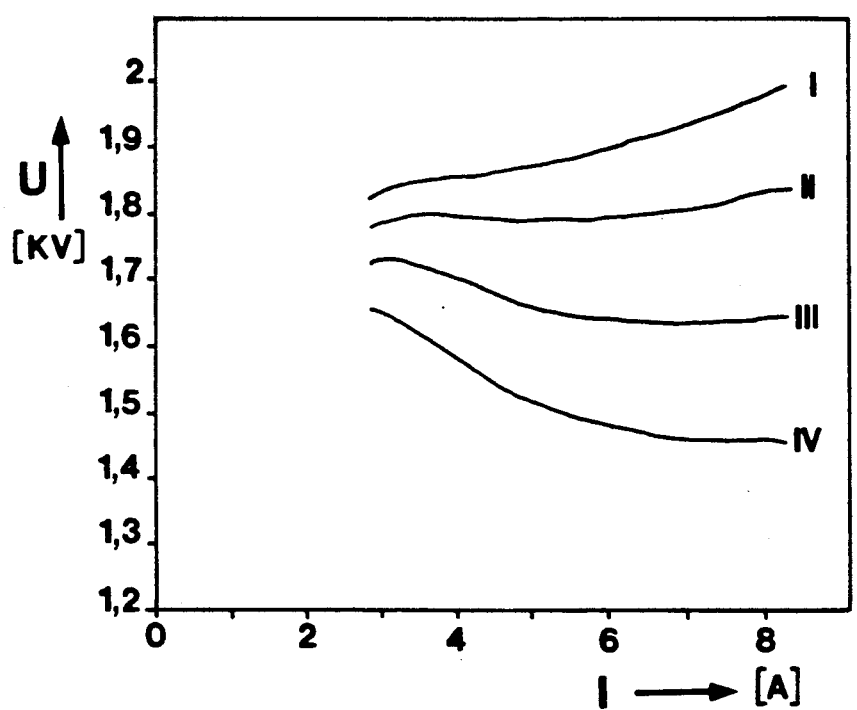
Figure 7:
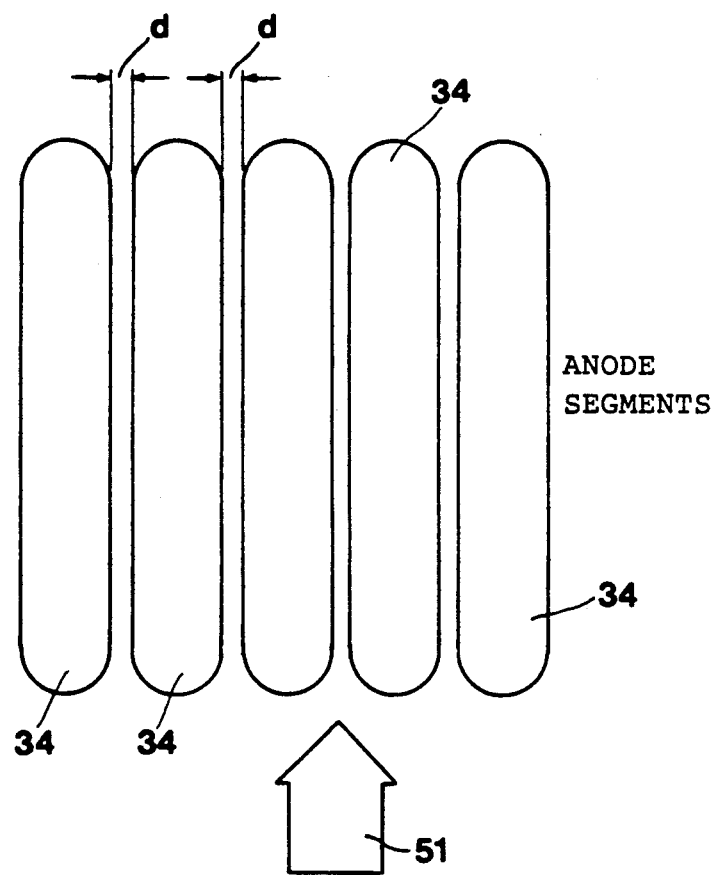
Figure 8:
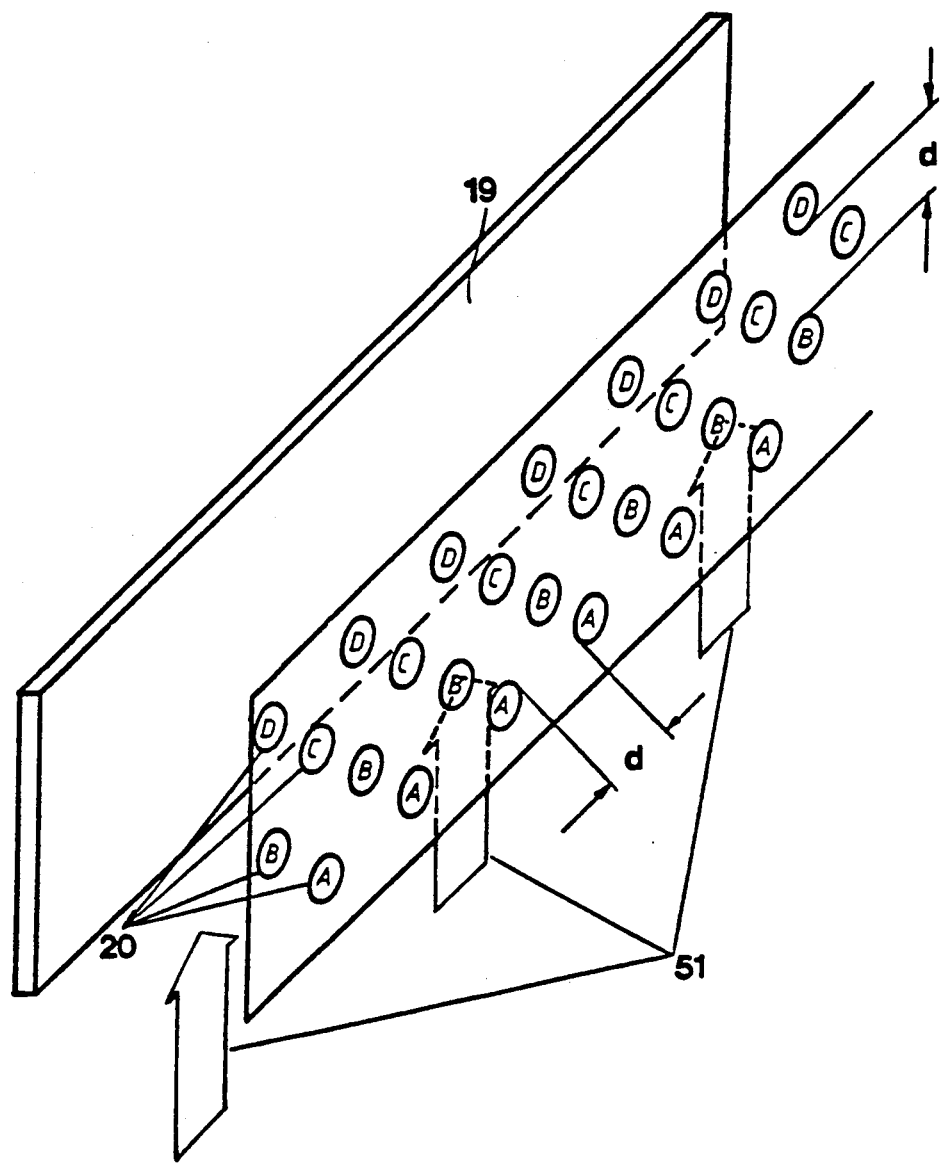
Figure 9:
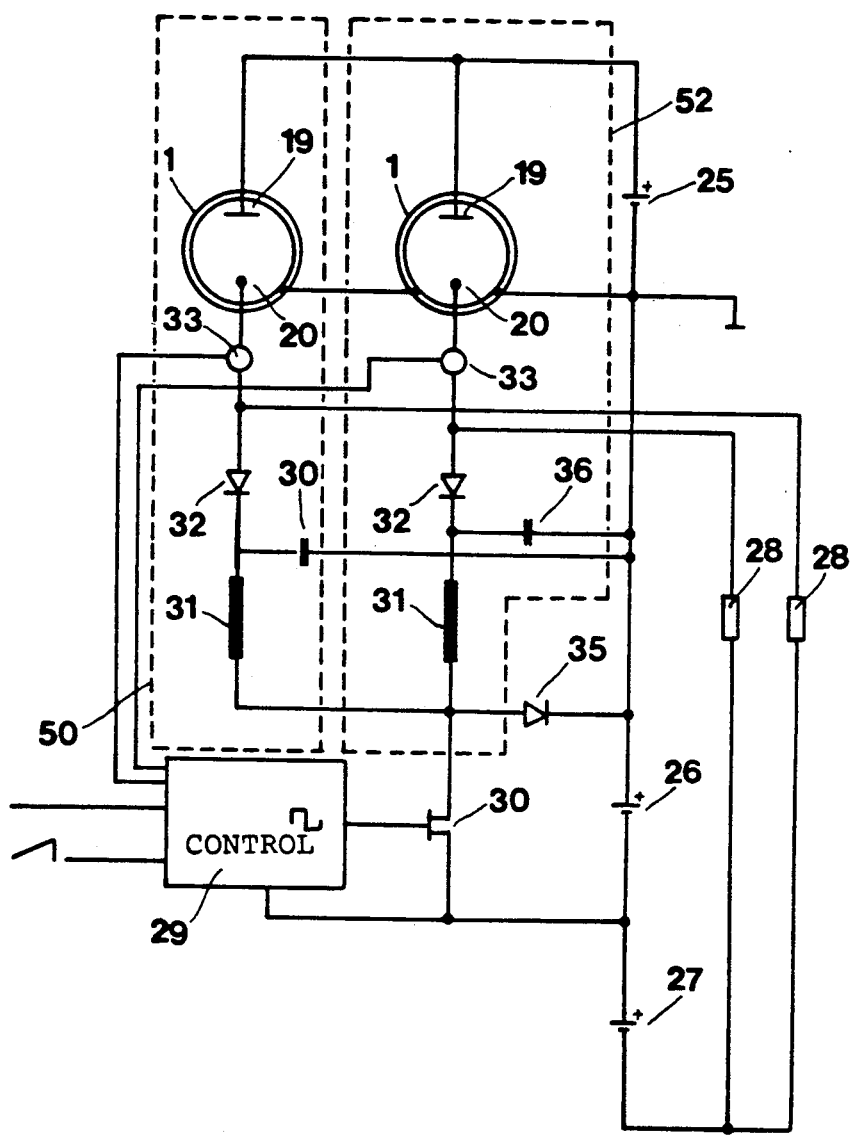

FIG. 1 is a cross sectional representation, transverse to the gas flow direction of the device, which is open toward the front, including the flow paths and electrodes, FIG. 2 is a diagrammatic representation of the discharge area of the pre-ionization, the anode, and the partial cathode as well as the corresponding switched-mode power supply units, FIG. 3 shows the electrical circuit for a partial cathode opposite the anode, FIG. 4 shows a corresponding application including several partial cathodes, FIG. 5 shows several switched-mode power supply units which are connected to central generator system and the modulator, FIG. 6 shows the characteristic field of the voltage current of a glow discharge in a laser-gas-mixture, FIG. 7 shows the separation of the anode in different anode segments, FIG. 8 is an example of a segmentation of the cathodes with a simultaneous row formation in direction to the gas flow and an offsetting shift of the corresponding rows, FIG. 9 shows tow coupled discharge modules.

DETAILED DESCRIPTION OF THE PREFERRED EMBODIMENT

According to FIG. 1, the laser has a longitudinally extended housing 1 with a circular cross section. Its entire cross section is filled by a closed gas flow channel 2. As indicated by flow arrows 4, a gas flow is maintained via a transverse-flow fan 5 in the gas flow channel 2. The fan axis 6 runs parallel to the axis 3 of the housing 1. The fan 5 has a blade ring 8 composed of individual blades 7. Its rotational direction is indicated by arrow 9. The individual blades 7 of the blade ring 8 of the fan stand alone allowing the gas flow to pass through this blade collar 8. On the suction side 10, a cooler 11 is inserted in the gas flow channel 2 in order to cool down the gas flow as it enters the fan 5. On the pressure side 12, the gas flow channel 2 converges toward the discharge chamber 13 which then diverges into the form of a diffusor 14 subsequently to the discharge chamber 13. At the end of the flow body 15, the gas flow is redirected by 180° toward the cooler 11. The optical axis of the laser run parallel to the axis 3 of the housing 1 and the fan axis 6. At the inner wall 16 of the gas flow channel 2 formed by the flow body 15, the pressure side 12 is separated from the suction side 10 of the fan 5 by a flow directing body 17 which extends in direction to the axis 6 of the fan 5 and is a part of the flow body 15.

At the entrance to the discharge chamber, a pre-ionizing electrode 18 is centrally disposed between the lateral walls bounding the discharge chamber. In the discharge chamber, there is an anode 19 at the inner wall 16 of flow body. Opposite this anode, there are four individual cathodes 20 which are spaced-apart from their corresponding lateral wall at a minor distance.

FIG. 2 is an enlargement of the area of the discharge chamber 13.

In flow direction of the gas, the pre-ionization electrode 18 is disposed in front of the first individual cathode 20 and the anode 19. It is spaced apart from both the anode 19 and the cathode 20 at the same distance. The pre-ionization electrode 18 includes an electrically conductive core 21 surrounded by sleeve 22 made of a dielectric material which is quartz glass or ceramic, for example.

As seen in FIG. 2, the pre-ionization electrode 18 is connected to an AC-generator 23. Between this pre-ionization electrode 18 and the electrodes 19, 20 the auxiliary discharge burns uniformly over the entire width of the gas flow channel 2 transverse to the flow direction. In the area of the auxiliary discharge, the gas is thus completely and uniformly pre-ionized at the entrance side of the electrodes 19, 20. The main discharge is immediately ignited between the electrodes with only a minor demand of energy. Already minor current strengths are sufficient to maintain a stable main discharge.

The DC current potential for feeding the electrodes 19, 20 is recovered by fast independently controlled switched-mode power supply units 24 with a load-independent current characteristics from the partial voltage sources 26 connected in series to a non-controlled DC voltage source 25 without dissipative resistances.

Due to a corresponding division of the power supply, via switched-mode power supply unit 24, in the series connected partial voltage sources 26, it is possible, on the one hand, that the maximum lock voltage for power transistors of approximately 1000 V is not exceeded and, on the other hand, that the potential difference with respect to the housing can be maintained at a low level.

In order to achieve a high optical efficiency of the transverse-flow laser, the discharge geometry can be fully matched to the geometry of the optical resonator. In a planar anode surface, the subdivision of the cathode into several individual cathodes in flow direction of the gases has the advantage that the discharge cross section is matched with the optical resonator.

In addition, when making extensive use of the gas flowing in the discharge area, the density n of the laser medium decreases in flow direction when the temperature increases. For a maximum optical efficiency of the resonator, the system aims at maintaining the optimally reduced field strength E/h in flow direction 4. This is accomplished by supplying each individual cathode 20 with an independent switched-mode power supply unit 24. The latter serves to select the focal voltage which corresponds to the local density and to adjust the power supplied to the individual cathodes 20 in flow direction 4. Further, the ratio of the cathode currents can be adjusted to the respective gas temperature and operating conditions.

The actuation of the switched-mode power supply unit was omitted in FIG. 2 for clarity's sake. Please refer to the following FIG. 5.

For an industrial laser which is operated at a controlled operating pressure, it is possible to obtain a power control of 0–100% by controlling the average current. The voltage change is less than 20%. If voltage deviation of the network system of +10/−15 are also taken into consideration, an uncontrolled base voltage of the anode DC voltage source 25 of 65% of the operating voltage of the laser, e.g. 2000 V, is sufficient.

This base voltage is recovered from a 12-pulse rectifier circuit in order to reduce the natural ripple of the superimposed AC to approximately 1% at 600 Hz. The control range of the switched-mode power supply units is then maintained.

The uncontrolled DC voltage of the anode is supplied at a rating of 97% by a transformer with a downstream rectifier, forming the DC voltage source 25 of the anode, and is directly connected to the anode 19.

The potential of the individual cathodes 20 is negative with respect to ground potential. The negative voltage at the cathodes 20, absolute against ground potential, can be slightly higher than the anode voltage since the geometric dimensions of the anode for forming an optimum discharge are larger. The distances to the conducting metal parts are consequently smaller. Another advantage of reducing the potential difference to the laser vessel is that the generation of undesired glow discharges at the voltage passageways across the wall of the laser vessel and the power supply passages to the electrodes with smaller insulating distances can be avoided, making the arrangement more reliable, simpler and less expensive.

The example of FIG. 3 shows how the switched-mode power supply unit 24 operates. The anode 19 of the laser is directly connected to the direct voltage source 25 of the anode. The voltage $U_1$ of the anode direct voltage 25 is smaller than the smallest voltage required to maintain the discharge between the anode 19 and the cathode 20. The voltage $U_2$ of the partial voltage source 26 is selected such that the sum of the voltages $U_1$ and $U_2$ of the direct voltage source 25 of the anode and the partial voltage sources 26 is slightly greater than the maximum voltage provided for the discharge path between the anode 19 and the cathode 20 in the desired operating and control range.

The voltage of the additional direct voltage source 27 increases the voltage $U_1+U_2$ to the value $U_1+U_2+U_3$. The latter is sufficient to generate a weak, point-focal glow discharge or even a simmering between the anode 19 and an individual cathode via a high-value current-limiting resistor 28 using a current of only a few mA.

If a control 29 switches a controllable switch 30 in the switched-mode power supply unit 24 so as to become conducting, this switch, for example, can be configured as a V-MOS, SIPMOS or the like, a current which increases linearly over time starts flowing via switch 30, inductor 31, simmer voltage separating diode 32, cathode 20 via a increasing discharge to the anode 19. A current sensor 33 senses the instantaneously flowing current. If the measured actual value corresponds to a prescribed desired value, a control 29 comparing this desired value to the actual value blocks the controllable switch 30. A recovery diode 35 releases the energy stored in inductor 31 to the load circuit of the laser discharge path with a current that declines in a linear way.

With the beginning of the next pulse, the controllable switch 30 is switched on again by the control signal of the control 29, and the current through inductor 31 and the connected load circuit increases again until it has returned the prescribed desired current value.

The voltage ripple in the range of the switching frequency can be reduced again in a defined manner by the inductor 31 and the additional capacity of a filter capacitor 36. The latter is switched parallel to the series connection of inductor 31 and the recovery diode 35. The switching frequency ranges between 10-300 kHz.

In an embodiment, the operating frequency is approximately 50 kHz. The pulse time is then 20 μs. When the desired value in the cathode circuit is reached, the controllable switch 30 is shut off in <1 μs. This also covers short-time instabilities of the discharge which are then included in the control. These load-independent current characteristics allow a new good control of the discharge path.

FIG. 4 shows an arrangement with several partial cathodes. The switching arrangement principally corresponds to the one of FIG. 3. Individual cathodes 20 extending into the flow channel are connected via switched-mode power supply units 24 to the tappings 37 between the partial voltage sources 25. While the controllable switch 30 is blocked, the recovery diodes 35 serve to bridge the respective partial voltage source. The cathodes of the recovery diodes are connected to the tappings 37. The current sensors 33 disposed between the partial cathode 20 and the switched-mode power supply unit 24 are connected to the actual value input 39 of the control 29. The actual value input of the control 29 bears the reference numeral 40. The control signal supplied at the output 41 of the control 29 is fed to the input 42 of the controllable switch 30. Each of the desired value inputs 40 is connected via signal line 43 to an output 44 of a desired value generator 45.

The arrangement represented shows the principle of a switching control. It does not show the supplementary circuitry necessary for a reliable operation such as relief switching circuits to limit the switching loss of the switching transistors or an additional current sensor which directly shuts off the switching transistor in less than 0.3 μs when a defined maximum current is exceeded or in particular when the proper function of the control is interrupted by component failure. The control also monitors the switching function of the switching transistor and the remaining components in order to centrally shut off the power supply to the laser in case of a system failure.

Moreover, there is no direct galvanic connection between the control and the switching transistor. For the purpose of galvanic separation, the On and Off control pulses are transmitted via pulse transformers; the control circuit is at ground potential, for example, and the switching transistor is at a negative potential of a some 100-1000 V with respect thereto. Since the control 29 is galvanically separated from the controllable switch 30, it is possible to provide each individual cathode 20 with its own control circuit. These control circuits are all at different potentials.

FIG. 5 shows several switched-mode power supply units 24 with a control 29. The desired value outputs 40 thereof are connected to the outputs 44 of a desired value generator 45. The latter is provided with function circuits. An additional input 46 connects control 29 to a pulse generator 48 which is actuated by a pulse-pause modulator and ensures a synchronization of all switching procedures in the switched-mode units. In addition, the pulse generator 48 releases a ragged-edged signal. The actual comparison between actual and desired values is carried out in control 29 by comparing the actual value of the current to the desired value of the current. The actual value of the current is obtained via current sensor 33.

It is advantageous to change the cathode current ratio of the cathodes during power control by means of an analog-amplitude. In order to realize this, the desired value generator 45 is provided with changeable function circuits. The functioning is optimized with regard to the respective mode of operation, for example, DC-operation only, pulse modulation, or superpulsing.

In order to have a stable laser performance, it is advantageous to shut down cathodes when the laser operates at low power so as to avoid a partial coverage of the discharge at the cathodes. The steepness of the current control of the cathodes which are not shut down is increased such that the effective steepness of the current control corresponds to the steepness of all simultaneously operated cathodes.

Since already minor cathode voltage differences cause a shift of the desired cathode current ratios, all switched-mode power supply units 24 are actuated via the same pulse generator. A pulse pause modulator 47 can also be used to control the laser power by means of a controllable pulse-pause sensing ratio. This also allows an independent control of the laser power by controlling the cathode currents and the sensing ratio. The frequency of the sensing modulation can be selected in a frequency range of 12 kHz of down to a few Hz in a geometrically graded way.

The control logic of the switched-mode units ensures that minimum On-sensing times and minimum Off-sensing times for the switching transistor are not exceeded during the control in order to allow the relief switching circuit sufficient time (approximately 1.5 μs) for its initial response.

The power that can be coupled out of a gas laser system can be directly combined with the mass throughput of the laser medium. An increase of the laser gas pressure thus leads to a power increase while the operating voltage of the laser between the electrodes is simultaneously increased as is the voltage control range. With an increased laser gas pressure and a high power density, there is an increased tendency of a constricting discharge, an arc formation. The formation of arcs can be suppressed by segmented electrodes, particularly anodes with starting resistors.

Advantageously, switching controls are used to supply power to the segmented anodes which have no dissipative starting resistors.

When the anodes have many segments, the relatively small currents require a higher inductance value. The switching transistors, as compared thereto, can be dimensioned for smaller peak currents and are hence much less expensive.

Connecting two switching controls in series allows controlling a maximum shut-off voltage of 1500-2000 V. The increase of a shut-off voltage due to the series connection is effective in the same way when one switching control is looped in the anode circuit and a second one in the cathode circuit.

As seen in FIG. 6, one specific voltage range which is a result of the control of the cathode current, can be associated with each cathode. This Fig. shows the characteristic field for the relation between the voltage U and the current I of the individual cathodes disposed on top of each other in the flowing laser medium. In FIG. 2, these individual cathodes bear the reference numerals 20. The top characteristic line designates the individual cathode 20 directly adjacent to the pre-ionization electrode 18. Due to the series connection of the partial voltage sources 26 of the cathode, this individual cathode has the greater potential difference with respect to the anode 19. The characteristic line IV corresponds to the individual cathode which is the most remote from the pre-ionization ionization electrode and has the smallest potential difference with respect to the anode. The other characteristic lines II and III represent the individual cathodes located therebetween.

When the power density in the laser medium is very high, a minor interference in the gas flow, e.g. turbulences caused by contamination, is already sufficient to trigger a sporadic arc discharge which causes the voltage to decrease at the corresponding anode segment 34 of FIG. 7. The short distances d of the anode segments 34 favor an arc formation between the segment with a reduced voltage and the adjacent segment. This in turn causes a snowballing expansion of the originally local interference.

FIG. 8 is an exemplary representation of a segmentation of the cathodes 20 with a simultaneous row formation in direction to the gas flows 51 and the four rows are shifted to be offset with respect to one another, for example, the rows of the individual cathodes 20 are referenced with the capital letters A, B, C, and D. The row of the individual cathode of FIG. 2 designated A corresponds to cathode 20 which is directly adjacent to the pre-ionizing electrode 18. Due to the series connection of the partial voltage sources 26 of the cathode, it also has the greatest potential difference to the anode 19. The row of individual cathodes 20 referenced as D corresponds to the individual cathode 20 which is the most remote from the pre-ionization electrode and exhibits the smallest potential difference to the anode. The remaining rows B and C of the individual cathodes 20 correspond in the potential to the individual cathodes 20 of FIG. 2 which are located therebetween. During operation, the individual cathodes 20 of row A are characterized by characteristic line I of FIG. 6 whereas the cathodes of row B are characterized by line II; the cathodes of row C by line III, and the cathodes of row D by line IV. Since the cathode surfaces can be configured smaller, according to FIG. 8, than the anode surfaces, the offset position of the cathodes increases the distance referenced as d. This improves the stability against a snowballing expansion of brief arc discharges.

Moreover, it is also possible that arc discharges occur between anode and cathode, between the cathodes and even between the anodes or cathodes and the walls of the vessel or other metallic parts of the construction. These uncontrolled arc discharges are sensed by differential current sensors whereas the current sensors for the control also have an overcurrent detection. In case of a leakage current or an overcurrent, the electronic switching elements, e.g. a GTO (gate turn off thyristor) or another power semiconductor, immediately shut down the system within 10 μs. After a short pause of approximately 1.5 ms during which the arc disappears, the discharge is automatically switched on again.

The actuation circuits of the switching control include functional monitoring circuits which cause a direct shut-off in case of component failure or operating failures.

According to FIG. 9, it is also possible to operate two separate discharge chambers via one common control circuit. The series connection, which follow the controllable switch 30, including the inductor 31, the simmering voltage separating diode 32, the current sensor 33, the individual cathodes 20 and the anodes 19 are connected in parallel. The two partial circuits share the use of the direct voltage source 25 of the anode, the partial voltage sources 26, the additional direct voltage source 27 and the recovery diode 35.

We claim:

1. Apparatus for the input of electrical energy into an active gas in a laser, said apparatus comprising
    a gas discharge chamber through which said gas flows at high velocity, said chamber comprising an input end and an exit end defining a direction of flow of said gas, and a pair of opposed sidewalls extending from said input end to said exit end,
    a planar anode adjacent to one of said sidewalls,
    a plurality of elongate cathodes adjacent the other said sidewall, said cathodes extending transversely of the direction of flow and succeeding each other in tandem in the direction of flow,
    a like plurality of series connected partial voltage sources for supplying direct current to said cathodes,
    a like plurality of fast, independently controlled switched mode power supply units configured as direct current controllers connected to respective cathodes, each unit being connected to said anode via at least a respective said partial voltage source,
    a like plurality of means for measuring the instantaneous current flowing to respective cathodes from respective power supply units, and
    means for comparing the respective measured cathode current to a desired value for the respective cathode current and supplying a control signal to the direct current controller when a control deviation occurs.

2. Apparatus as in claim 1 further comprising an elongate pre-ionizing electrode at the input end of said discharge chamber.

3. Arrangement in accordance with claim 1, characterized in that a non-stabilized direct current source 25 of the anode is interposed between the anode 19 and the partial voltage sources of the cathode.

4. Arrangement in accordance with claim 1, characterized in that the fast switched-mode power supply unit contains a field-effect transistor as a controllable switching element 30.

5. Arrangement in accordance with claim 1, characterized in that transverse to the flow direction of the gas, each individual cathode 20 is subdivided in partial segments.

6. Arrangement in accordance with claim 5, characterized in that power is supplied to each partial segment of each individual cathode by means of an independently controlling switched-mode power supply unit 24.

7. Arrangement in accordance with claim 1, characterized in that transverse to the flow direction, the anode is subdivided in several juxtaposed individual anodes.

8. Arrangement in accordance with claim 7, characterized in that each individual anode is subdivided in partial segments.

9. Arrangement in accordance with claim 7, characterized in that power is supplied to each individual anode or each individual segment by means of an independently controlled switched-mode power supply unit 24.

10. Arrangement in accordance with claim 1, characterized in that the pre-ionization device 18 is at least one dielectrically enveloped electrode to which power is supplied via an alternating current generator 23.

11. Arrangement in accordance with claim 10, characterized in that the alternating current generator 23 has constant current characteristics.

12. Arrangement in accordance with claim 11, characterized in that the alternating current generator 23 has a function monitoring device which in case of a short circuit or a incorrect functioning of the electrical system of the pre-ionization device shuts down the switched-mode power supply units of the cathodes and anodes.

13. Arrangement in accordance with claim 1, characterized in that the partial voltage sources 26 of the cathodes have a negative voltage potential with respect to the housing 1 surrounding the discharge chamber and the anode 19 has a positive potential with respect to the housing.

14. Arrangement in accordance with claim 1, characterized in that the ratio of the cathode currents can be selected via a desired value actuation circuit of the switched-mode power supply units 24.

15. Arrangement in accordance with claim 1, characterized in that the individual cathodes can be shut down.

16. Arrangement in accordance with claim 1, characterized in that the control element of the switched-mode power supply unit can be synchronously controlled by a pulse generator 48.

17. Arrangement in accordance with claim 1, characterized in that each individual cathode is associated with a cathode path limiting device which interrupts the current circuit of the individual cathode 20 when a permissible cathode current is exceeded.

18. Arrangement in accordance with claim 1, characterized in that each switched-mode power supply unit is associated with a protective diode circuit in order to protect the switched-mode power supply units 24 from peak voltages until the current path interruption is effective.

19. Arrangement in accordance with claim 16, characterized in that the cathode current limiting device has a timer which is activated when the current path is interrupted and which closes the current path after a prescribed period of time has elapsed and which has the respective current path increase over a time function to the original desired value of the cathode current.

20. Arrangement in accordance with claim 17, characterized in that an integrated circuit senses several successive shut-downs and shuts off the discharge in a controlled manner when a limiting value is reached.

21. Arrangement in accordance with claim 17, characterized in that when an individual cathode is shut down, a simmer discharge burns at this individual cathode.

22. Arrangement in accordance with claim 21, characterized in that the simmer discharge is carried out via a current limiting resistor 28.

23. Arrangement in accordance with claim 22, characterized in that the simmer discharge is carried out via the current limiting resistor 28 and an voltage source 27.

24. Arrangement in accordance with claim 17, characterized in that the current path is interrupted by a relay-contact and/or a semiconductor device.

25. Arrangement in accordance with claim 1, characterized in that a pulse-pause-modulator 47 is provided which actuates and modulates the pules generator 48.

26. Arrangement in accordance with claim 1, characterized in that via a signal line 43, the switched-mode power supply units of each individual cathode are connected to a central desired value generator 45 for the supply of desired values.

27. Arrangement in accordance with claim 25, characterized in that the pulse-pause generator 47 supplies a pulse sequence frequency between 12 kHz and 0.6 Hz to the pulse generator, these frequencies being geometrically graded.

28. Arrangement in accordance with claim 16, characterized in that the pulse generator is synchronized with the pulse-pause-modulator 47 in a phase-locked manner and in that the starting command of the modulation is synchronized with the starting command of the discharge.

29. Arrangement in accordance with claim 5, characterized in that at least two partial segments of adjacent individual cathodes 20, which are disposed transversely to the flow direction of the gas on approximately the same level, are operated via one switched-mode power supply unit 24 and at least one switching inductor associated with each partial segment.

30. Arrangement in accordance with claim 1, characterized in that at least two discharge modules 50, 52 are coupled to each other wherein at least two individual cathodes 20 or at least two partial segments of individual cathodes of the first 50 and the second module 52 are operated via one switched-mode power supply unit and at least one inductor 31 which is associated with each individual cathode or each individual segment.

* * * * *